(No Model.)

H. LEIX.
Peel.

No. 236,501. Patented Jan. 11, 1881.

Witnesses
Charles R. Searle.
Charles C. Stetson

Inventor
Hermann Leix
by his attorney
R. D. Stetson

United States Patent Office.

HERMANN LEIX, OF LANDSBERG-ON-THE-WARTA, PRUSSIA, GERMANY.

PEEL.

SPECIFICATION forming part of Letters Patent No. 236,501, dated January 11, 1881.

Application filed October 8, 1880. (No model.) Patented in Germany July 16, 1880.

*To all whom it may concern:*

Be it known that I, HERMANN LEIX, a citizen of Germany, residing at Landsberg-on-the-Warta, in the Kingdom of Prussia, Germany, have invented certain new and useful Improvements in Peels, of which the following is a specification.

Figure 1:
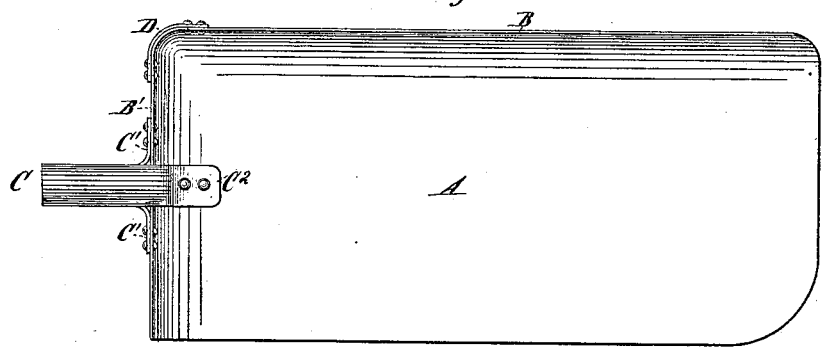
Figure 2:
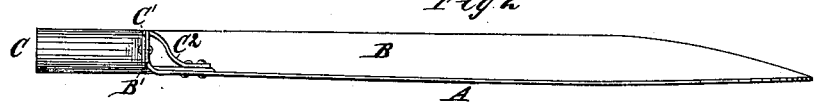
Figure 3:
Figure 4:
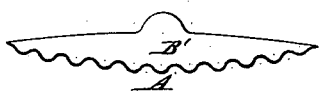
Figure 5:
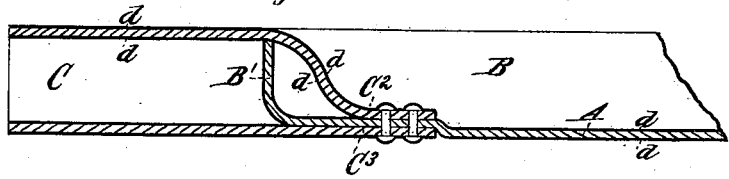

In the accompanying drawings, in which similar letters indicate corresponding parts, Figure 1 is a plan view of the blade of the peel; Fig. 2, a side view; Fig. 3, an end view, and Fig. 4 an end view of the blade corrugated lengthwise. Fig. 5 is a longitudinal section through a portion on a larger scale.

The invention relates to peels the blade of which is made of metal; and the object of the invention is to produce such metallic blades which remain dry when brought into the oven, and on which the hot bread will not adhere, and which further, by their form, facilitate the removing of the bread out of the oven.

It has been often attempted to make the peel-blades of metal, but without any good result, as the blade is covered with condensed water as soon as it is brought into the hot oven. The bread sticks tightly to the moist blade, and presents, after being violently removed from it, a broken under crust, or, at least, one dotted with brown spots of iron rust. The improved blade avoids all these inconveniences. The peel-blade is a piece of sheet iron or steel, A B B', the two parts B B' of which are bent upward, but forming round corners. The bottom A is not flat, but, as shown in Figs. 2 and 3, a little concave on the upper side.

For receiving the handle of wood (not represented) the socket is divided at the front end into four parts. Two of these parts are spread apart laterally and riveted to the back rim, B', as indicated by C'. Another is formed downward from the upper side, as indicated by C², and another is extended forward under the blade A, which is raised at that point sufficiently to allow for its thickness, as indicated by A'. All the branches are secured to the parts A B B' by rivets or other reliable fastening.

The whole body A is corrugated longitudinally. This feature is shown distinctly in Fig. 4. It gives stiffness with but little weight.

The whole blade is painted inside and outside with a good oil-paint, $d$. With this coat of paint on, the blade is put into a hot oven for as long a time as is necessary to dry the paint, or, more correctly termed, to "bake" it, producing a smooth, glossy, non-conducting coating which will stand for a long time. The so-prepared blade facilitates the work of taking out the loaves, as it slips very easily under the loaves while the end of the handle is raised, and when the handle is depressed the loaves will move by themselves to the hind part of the blade and be retained by it.

The new blade, by reason of its glossy and non-conducting coating $d$, will not condense the watery vapors when brought into the hot oven, and the bread will not stick or adhere to it.

It must be remarked that the blade can be made without two sides bent upward—more in shape of a shovel-blade. It can also be made with some success without the corrugations, the most essential feature being its baked-paint coat.

I claim as my invention—

1. A peel-blade made of sheet iron or steel, having a more or less concave bottom, corrugated lengthwise, coated with oil-paint baked or burned to the metal by heat, in combination with a socket for the handle, as set forth.

2. In a baker's peel, the combination of the sheet-metal blade A, having the bent-up sides B B', with the handle-socket C C' C² C³, as herein specified.

3. A baker's peel made of sheet metal and provided with a coating of oil-paint, $d$, baked or burned thereon by heat, as set forth.

This specification signed by me this 4th day of August, 1880.

HERMANN LEIX.

Witnesses:
    FRANZ SCHULTZE,
    BERTHOLD ROI.